United States Patent [19]
Munsch et al.

[11] Patent Number: 5,667,671
[45] Date of Patent: Sep. 16, 1997

[54] SALT WATER AQUARIUM INTEGRATED FILTER

[76] Inventors: Paul B. Munsch, P.O. Box 675165, Rancho Santa Fe, Calif. 92067; Shane E. Wrightson, 3501 E. 52 St., Mawood, Calif. 90270

[21] Appl. No.: 642,970

[22] Filed: May 6, 1996

[51] Int. Cl.⁶ .................................................. A01K 63/04
[52] U.S. Cl. .................. 210/151; 210/169; 210/221.2; 210/232; 210/416.2; 210/266; 210/286
[58] Field of Search ......................... 210/150, 151, 210/169, 221.2, 232, 416.2, 631, 661, 266, 286

[56] References Cited

U.S. PATENT DOCUMENTS

| | | | |
|---|---|---|---|
| 3,661,262 | 5/1972 | Sanders | 210/169 |
| 3,835,813 | 9/1974 | Katz | 119/260 |
| 4,606,821 | 8/1986 | D'Imperio | 210/169 |
| 4,684,462 | 8/1987 | Augustyniak | 210/169 |
| 4,988,436 | 1/1991 | Cole | 210/169 |
| 5,084,164 | 1/1992 | Del Rosario | 210/169 |
| 5,234,581 | 8/1993 | Rosenberg | 210/169 |
| 5,453,183 | 9/1995 | Hoffa | 210/169 |
| 5,514,280 | 5/1996 | Logan | 210/169 |
| 5,554,280 | 9/1996 | Loehr | 210/169 |

*Primary Examiner*—Peter A. Hruskoci
*Assistant Examiner*—Theodore M. Green
*Attorney, Agent, or Firm*—Albert O. Cota

[57] ABSTRACT

An aquarium integrated filter (10) that is designed to maintain the purity, cleanliness and biological health of an aquarium (250). The filter (10) includes within a single enclosure (12) all the filtering elements that are necessary to perform proper filtration of a salt water aquarium. These filters consist of: a coarse pad filter (58), a chemical media filter (70), a fluidized biological bed filter (102), a venturi protein skimmer (124), a wet/dry filter (174) and a micron filter (180). The enclosure (12) also includes a filter outlet fitting (28) and a filter inlet fitting (52). Likewise, the aquarium includes a tank inlet fitting (252) and a tank outlet fitting (254). To connect the aquarium integrated filter (10) to the aquarium (250), the filter outlet fitting (28) is connected, via a primary water pump (206), to the tank inlet fitting (252) and filter inlet fitting (52) is connected directly to the tank outlet fitting (254).

16 Claims, 4 Drawing Sheets

SALT WATER AQUARIUM INTEGRATED FILTER

TECHNICAL FIELD

The invention pertains to the general field of aquarium filtration and more particularly to an aquarium filter utilizing several integrated filtering means within a single enclosure.

BACKGROUND ART

To insure the health of marine animals and plants that live in salt water aquariums, it is necessary to maintain the cleanliness, purity and health of the water. Examples of impurities, which commonly degrade the aquarium environment, are organic wastes, such as fish feces and uneaten food, chemicals in unpurified water and common house dust. Any of these impurities can effect the desired chemical balance of the water and, in particular, the ammonia nitrate cycle, which results from the break-down process of nitrogenous waste. The rate of rise of the nitrate concentration greatly effects the environment within the aquarium and, to a large extent, the level of nitrates determines the frequency that the water must be changed. Accordingly, a great number of products for filtering and treating aquarium water have been developed.

On smaller fresh water aquariums, filtering may only consist of a simple filtering element for controlling water circulation, and an aeration system. On larger aquariums, and particularly salt water aquariums where delicate varieties of fish and other marine life live, a more complex filtering system must be utilized, such as a wet/dry filter. A wet/dry filter operates by skimming water from the top of the tank by means of a prefilter box, and diffusing the water through a filtering chamber. The wet/dry filter uses media that operates both partially in the air and partially submerged in the water, which allows the contaminated water to be diffused through the filter in small droplets. Other types of filter media used in the art are Double Layer Spiral filters (DLS) or Bio-Balls.

Chemical filtration, which facilitates the removal of, or deactivation of, organic substances is also well known in the art. Activated carbon and ion-exchange resins are commonly used materials in this type of filtration. While this type of filtration is frequently utilized, it is generally ineffective for purifying the water and eliminating many of the commonly known nitrogenous waste products.

Another type of filtration that is probably the most important and least utilized, is that of aerobic biological filtration. Aerobic biological filtration is accomplished by means of a living organism, primarily bacteria. The break-down process of nitrogenous waste by the bacteria is known as nitrification. During nitrification, accumulated ammonia in the tank is converted to nitrites and nitrates. The ammonia is oxidized by nitrosomonas bacteria to nitrites. The nitrites are then further oxidized by nitrobacteria to produce nitrates which are not toxic.

The use of biological aerobic filtration is also important because it serves to convert toxic ammonia to nitrates, thus forming a complete ecosystem. Prior art filters which provide aerobic filtration, such as the previously mentioned wet/dry and chemical filtration can be complex, inefficient, large and expensive. These filters include a separate component or chamber providing mechanical filtration and an aerobic component or chamber providing the wet/dry filtering. Most of these type of filters use siphon tubes to remove water from the tank and a pump to return the filtered water.

These prior art filters require siphon tubes to draw aquarium water from a profilter into the primary filter from where the water is routed into a sump where a pump pumps the aerobically filtered water back into the aquarium. As a result, the filters require a balance between the input to the primary filter and the output of the prefilter, to avoid either overflowing the aerobic chamber or not having sufficient water for the motorized/electric pump to return the water to the aquarium. These filters are not adaptable for use with a gravity return mechanism as they are gravity fed, therefore they must use a pump to return the water. Further, some of these types of filters do not have any safeguards in case the pump(s) should clog or stop, thereby causing water to over flow the sump of other components.

It has become apparent that there is a need for an integrated salt water filter system which will satisfy the requirements of the various marine life housing situations, and provide exceptional mechanical and aerobic filtration, that is conveniently and easily installed, used and maintained.

A search of the prior art did not disclose any patents that read directly on the claims of the instant invention however, the following U.S. patents were considered related:

| U.S. PAT. NO. | INVENTOR | ISSUED |
|---|---|---|
| 5,397,463 | Woltmann | 14 March 1995 |
| 5,171,438 | Korez | 15 December 1992 |
| 5,084,164 | Del Rosario | 28 January 1992 |
| 5,006,230 | Votava III, et al | 9 April 1991 |

The U.S. Pat. No. 5,397,463 Woltmann patent discloses an aquarium filtration device for salt water aquarium tanks, which utilizes a combination of a physical filter and an aerobic filter positioned externally of the aquarium tank. Water is fed into the physical filter chamber by gravity tubes and upon reaching a level above the chamber walls of the physical filter it spills by gravity flow to both an aerobic filter, also contained within the housing, and back into the aquarium tank. The water passing through the aerobic filter then returns to the physical filter where the filtering is repeated.

The U.S. Pat. No. 5,171,438 Korez patent discloses a mechanical aquarium filtration system, biological in nature, having the capability to include chemical filtration. The system uses high-density filter elements for biological bacteria, in a series of chambers operated by a single pump.

The U.S. Pat. No. 5,084,164 Del Rosario patent discloses a filter assembly and housing for use with a small salt water aquarium that includes a housing formed of two molded halves of high impact thermoplastic resin, each having a flange and where in the flanges are fastened together to provide a complete housing and includes a lid structure for the housing. The housing halves include a number of pairs of horizontal inwardly extending shelves on each half which provide support for internal components that include a DLS filter element and a plastic grid support. A plate is included for supporting an elbow member that receives water from the aquarium and an adjustable diffuser attached to the elbow for distributing the water over the filter element. Additionally, there is a second plastic grid support below the filter element and additional filtering and/or buffering material supported thereon, a window and channel molded into the front half of the housing and a float-operated low water indicator to indicate a low water condition by appearing in the window. A protein skimmer can be located in the housing to remove surfactants from contaminated water. The housing connects to an external motor pump to pump cleaned water back to the aquarium.

The U.S. Pat. No. 5,006,230 Votava III, et al patent discloses an aquarium water filtration system which includes intake means for aquarium water, prefilter means and water transfer means for aquarium water to transfer from the intake to the prefilter. Both mechanical and froth filtration of the aquarium water is carried out in the prefilter, which comprises a plurality of chambers separated by walls of different heights. The aquarium water is gravity fed into and through the prefilter, and between the various chambers of the prefilter, its flow being determined by the relative heights of the separating walls, as well as by the heights of openings in certain areas of the walls.

For background purposes and as indicative of the art to which the invention relates, reference may be made to the following remaining patents found in the search.

| U.S. PAT. NO. | INVENTOR | ISSUED |
| --- | --- | --- |
| 5,306,241 | Weinstein | 26 April 1994 |
| 5,242,582 | Marioni | 7 September 1993 |
| 5,108,594 | Givanetti, et al | 28 April 1992 |

DISCLOSURE OF THE INVENTION

The salt water aquarium integrated filter is designed to be connected in series with an aquarium that includes a tank outlet fitting and a tank inlet fitting. The integrated filter inlet fitting is connected, via a conduit, to an outlet fitting on the aquarium. Likewise, the tank inlet fitting is connected, via a conduit, to the filter outlet fitting on the integrated filter's pump. It is the purpose and design of the invention to maintain the water in the aquarium at an optimum level of purity, cleanliness and health.

The aquarium integrated filter consists of a single enclosure that contains a plurality of components which are parallel and sequentially connected. Each component performs a specific function to enhance and facilitate the complete filtering process. The function performed by each subsequent component is crucial in the proper sequence.

Between the filter outlet fitting and the tank inlet fitting is located a primary pump that maintains the flow of the filtered water from the integrated filter back into the aquarium. All the filtering components interface with a sump that extends across the bottom of the enclosure.

In its basic design, the aquarium integrated filter consists of the following components, which are listed in sequential order starting from the filter inlet fitting and terminating at the filter outlet fitting:

a. A coarse pad filter which initially receives the water from the aquarium via the filter inlet fitting and that functions to remove larger particulate matter and waste particles, b. A chemical media filter which receives the filtered water from the coarse pad filter and further removes dissolved chemical toxins and traps waste particles, c. A fluidized biological bed filter which is supplied water, via a first pump located within the sump, the filtered water from the coarse pad filter and the chemical media filter prior to flowing into the sump. The fluidized biological bed filter performs a primary nitrification process, d. A venturi protein skimmer which is supplied filtered water, via a second pump located within the sump. The pump forces oxygenated water upward through a venturi adapter, wherein surfactants bond with oxygen molecules and exit the protein skimmer. From the venturi protein skimmer, the organic waste product is deposited into a protein-skimmer catch cup. The catch cup is removed at periodic intervals to dispose the collected organic waste product, and e. A wet/dry filter that receives the filtered water from the fluidized biological bed filter and the venturi protein skimmer to provide further nitrification of water from the venturi protein skimmer and to reoxygenate the oxygen-depleted water from the fluidized biological bed filter. From the wet/dry filter the filtered water is pumped by a primary water pump through the tank inlet fitting back into the aquarium.

Additionally, in some aquarium designs, an overflow catch cup may be employed. The overflow catch cup is attached to one side of the enclosure at a level below the protein skimmer catch cup. The two catch cups are interconnected by means of a conduit such that the overflow catch cup receives the overflow of organic waste from the protein skimmer catch cup. The overflow catch cup is located so that it can be easily removed to allow the collected broken-down protein waste product to be disposed. Thus, the protein skimmer catch cup, does not require removal and cleaning at such frequent intervals.

In view of the above disclosure, it is the primary object of the invention to provide a salt water aquarium integrated filter that is easy to install and maintain, and that purifies chemically and biologically the aquarium water at optimum levels of cleanliness, purity and biological health.

In addition to the primary function of the invention it is also the object to produce an aquarium integrated filter that:

is more compact, and therefore takes less space than conventional multiple modular filters, is reliable and easy to maintain, is designed to accommodate various size ranges of aquariums from 40 to 400 gallons, and is easy to install.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
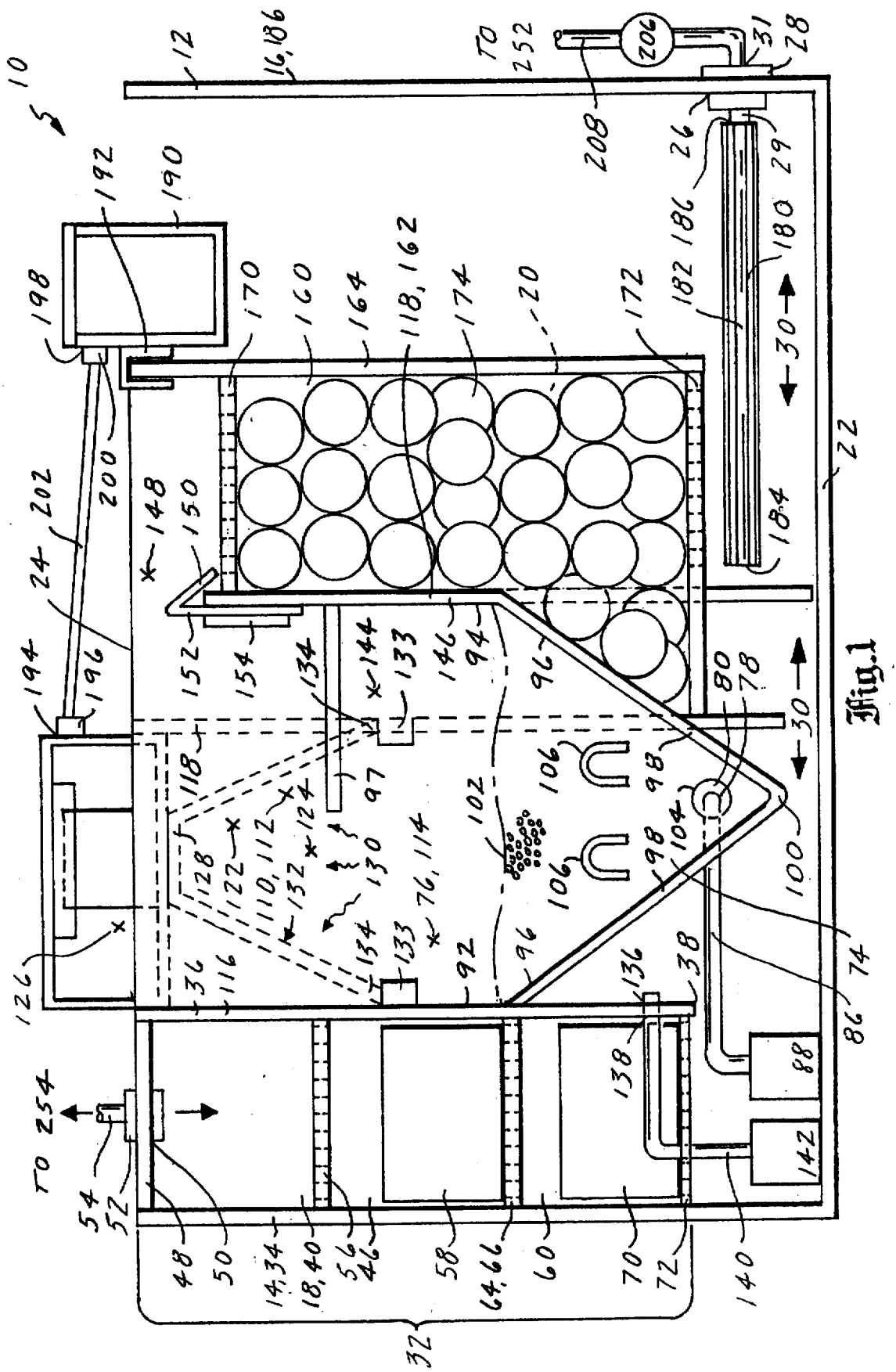
FIG. 1 is an elevational front view of the salt water aquarium integrated filter.
Figure 2:
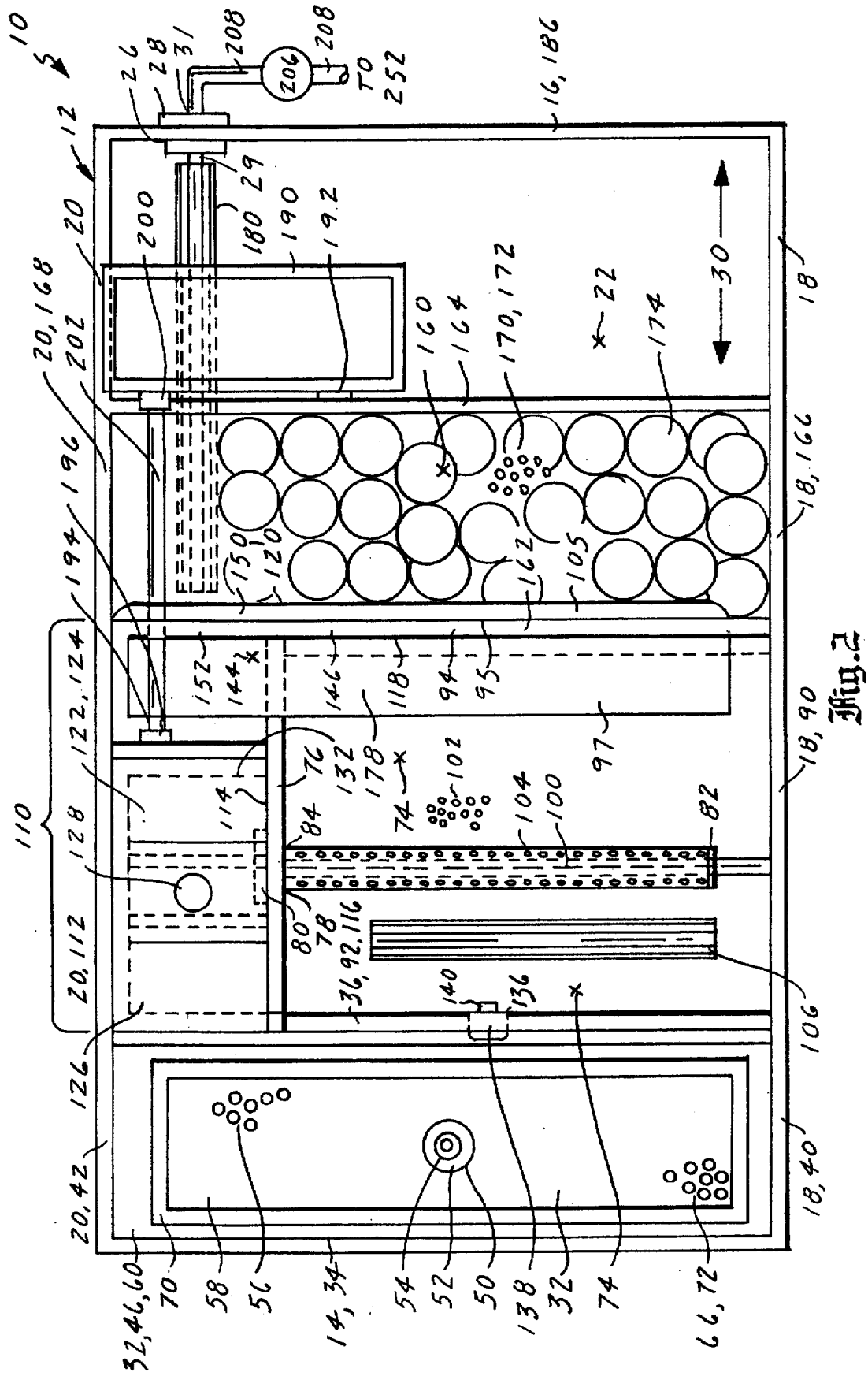
FIG. 2 is a top plan view of the salt water aquarium integrated filter.

The best mode for carrying out the invention is presented in terms of a preferred embodiment for a salt water aquarium integrated filter 10 that maintains the purity, cleanliness and biological health of the aquarium water. The aquarium integrated filter 10, as shown in FIGS. 1-3, is comprised of a single enclosure 12 that houses all the inventive elements, with the exception of an externally located primary pump 206 that is used to pump the filtered water from the integrated filter 10 into the aquarium 250. The connection from the integrated filter 10 to the aquarium 250 is made through a tank inlet fitting 252 that receives the filtered water from the integrated filter 10 and a tank outlet fitting 254, from where the aquarium water is returned to the integrated filter 10 through a filter inlet fitting 52.

The enclosure 12, as shown in FIGS. 1 and 2, is preferably constructed of plexiglass, however, other durable easily cleaned materials such as Levan® may also be used. The enclosure 12 consists of a first side member 14, a second side member 16, a front member 18, a rear member 20 and a lower member 22. The upper end 24 of the enclosure 12 is open, except for the first and third chambers as shown in FIG. 1. The second side member 16 has a bore 26 located adjacent to its lower edge. Into the bore 26 is inserted and attached a filter outlet fitting 28. Across the entire length of the lower member 22 between the first and second side members 14,16 and front and rear members 18,20, extends a sump 30.

Within the enclosure 12 is located a first chamber 32, a second chamber 74, a third chamber 110 and a fourth chamber 160.

The first chamber 32, as shown in FIGS. 1 and 2, has an outer side 34 that is formed by the first side member 14 of the enclosure 12, and an inner side 36 having a lower edge 38 that interfaces with the sump 30. The first chamber 32 also has front and rear sides 40,42 that are comprised of the front and rear members 18,20 of the enclosure 12 as shown in FIG. 2. The first chamber houses an upper compartment 46 and a lower compartment 60.

Figure 3A:
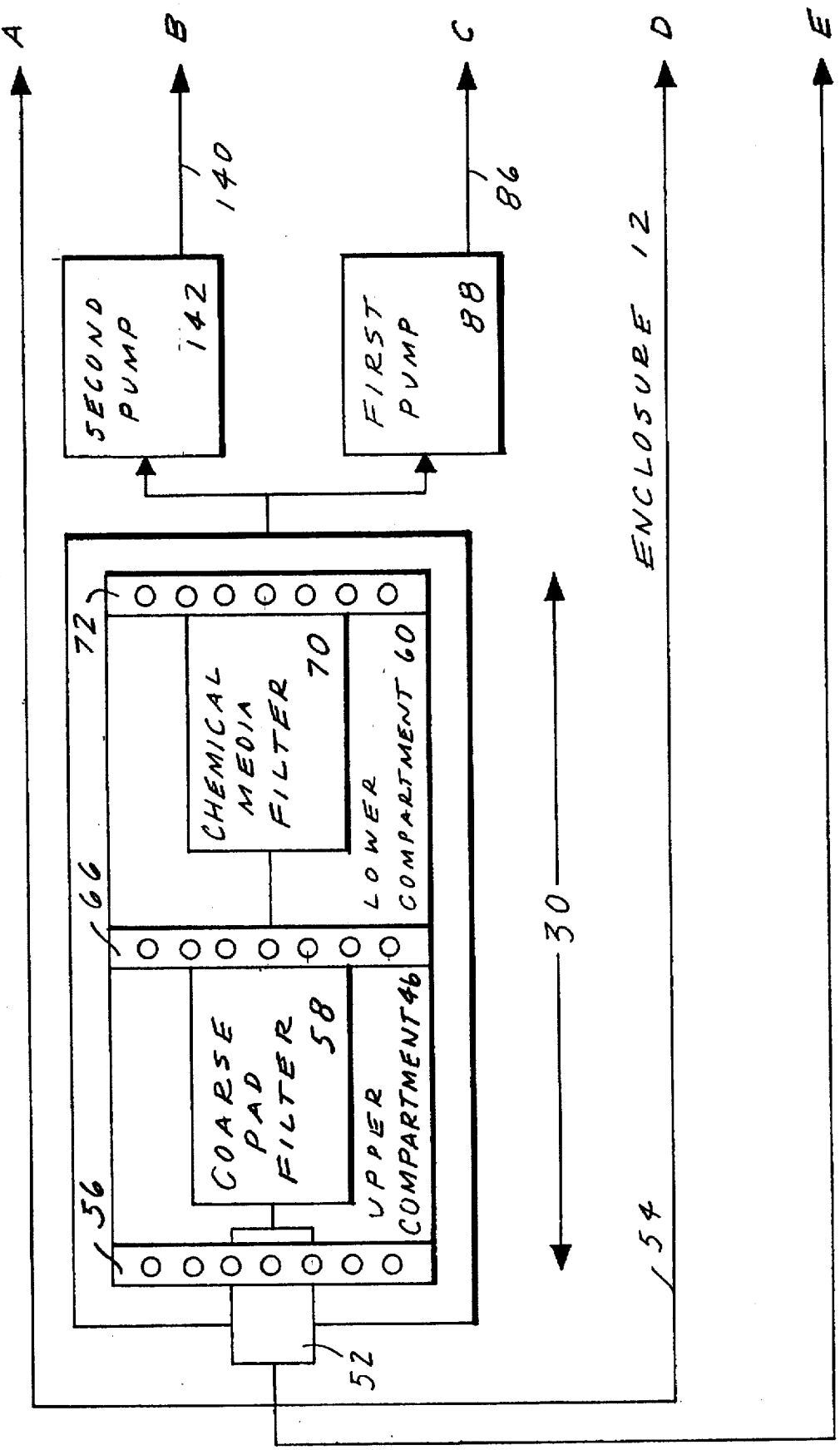
FIGS. 3A-3B are block diagrams showing the functional flow path of the water through the salt water aquarium integrated filter.
Figure 3B:
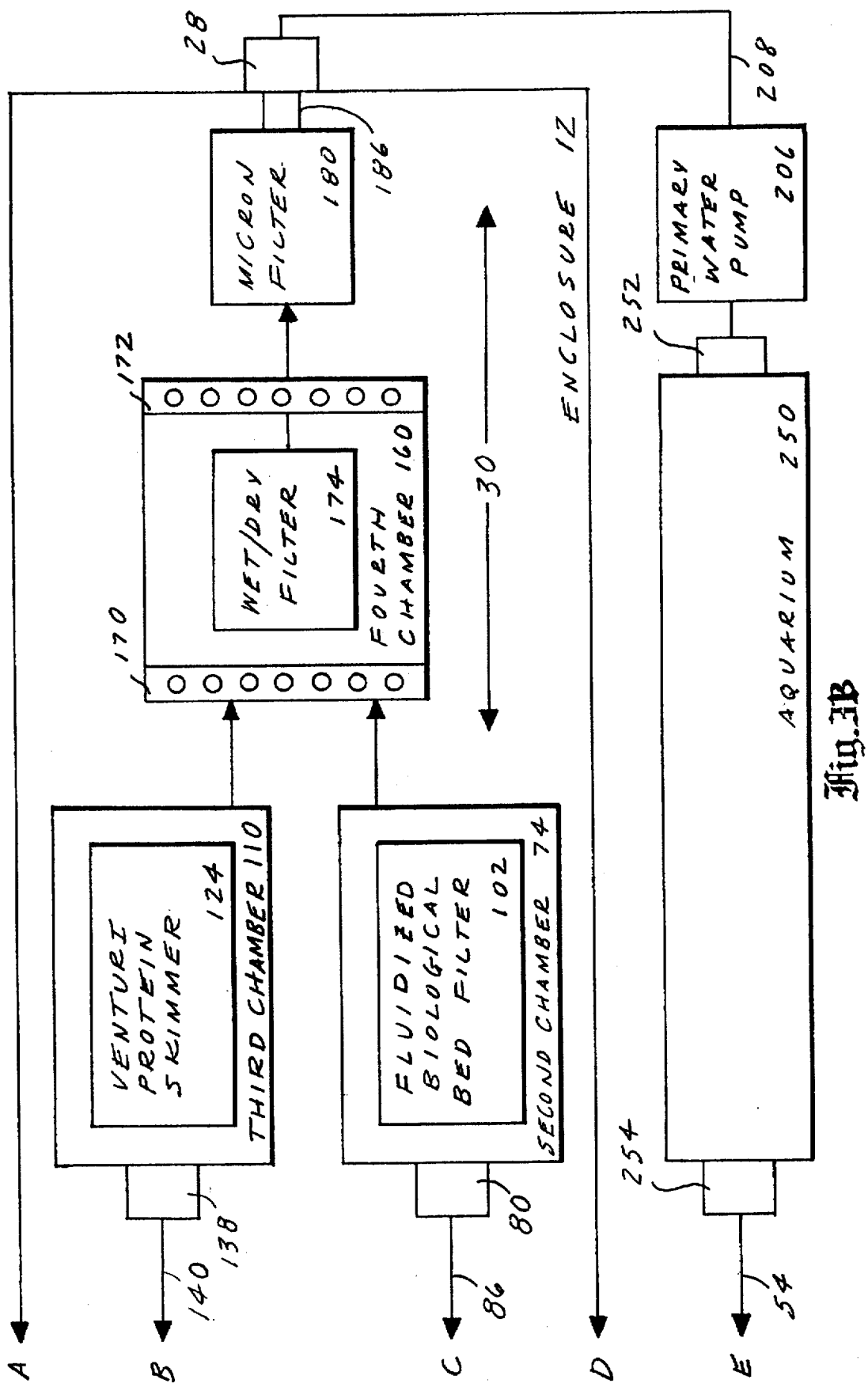

The upper compartment 46, as shown in FIGS. 1 and 2, consists of an upper section 48 having a bore 50 therethrough. Into this bore is inserted and attached a filter inlet fitting 52 that is connected, via a conduit 54, to the tank outlet fitting 254 on the aquarium 250 as shown in FIGS. 3A and 3B. The conduit 54, as well as any conduit used in the invention, can be constructed of any rigid of flexible material that can transport the water flowing through the aquarium and integrated filter. The conduits, however, are typically constructed of a plastic with polyvinyl chloride (PVC) preferred. The upper compartment 46, as best shown in FIG. 1, includes a drip dispersement plate 56 and a first perforated grid 66. The plate 56 is an acrylic catch tray that includes a plurality of bores to allow the incoming water to be evenly dispersed. The perforated grids are typically made of a plastic material and contain a multiplicity of openings which permit water to drain by gravity through the entire area of the grid.

The water from the inlet fitting is dispersed by the drip dispersement plate 56 onto the first perforated grid 66. Upon the surface of the first perforated grid 66 is located a coarse pad filter 58, which may consist of a coarse sponge or other like material. The purpose of the coarse pad filter 58 is to remove larger particulate matter and solid waste particles such as uneaten food, dead plant life and similar elements.

The lower compartment 60 of the first chamber 32, as shown in FIG. 1, has an upper section 64 that consists of the first perforated grid 66 and a lower, second perforated grid 72. Upon the surface of the second perforated grid 72 is placed a chemical media filter 70 that preferably consists of activated charcoal. However, other similar substances such as phosphate remover, nitrate remover, active resins, etc. may also be used. The chemical media filter 70 receives the filtered water from the coarse pad filter 58 and provides further filtration by removing dissolved chemical substances and smaller waste particles. The chemical media filter 70 functions to maintain the quality and chemical cleanliness of the water.

Sequentially following the first chamber 32 is a second chamber 74 that is substantially longitudinally centered within the enclosure 12 and that functions as a fluidized biological bed filter 102. This filter provides additional filtering to help maintain the purity, cleanliness and biological health of the water.

The second chamber, as shown in FIGS. 1 and 2, has a rear side 76 and a front side 114. The rear side has a bore 78 therethrough. Into this bore, as best shown in FIG. 1, is attached a water inlet fitting 80 that includes an outer end and an inner end. The outer end is attached, via a conduit 86, to a first pump 88, as shown in FIG. 1. The first pump 88 is located within the sump 30 and pumps the water being supplied to the sump 30 from the first chamber 32. The second chamber 74 also has a front side 90, as shown in FIG. 2, which consists of the front member 18 of the enclosure 12, a first side 92 and a second side 94. From near the center of the first and second sides 92,94, as best shown in FIG. 1, two sections 96 form an enclosed V-shaped structure 98, having an apex 100. The apex 100 is located within the sump 30 and above the lower member 22 of the enclosure 12. The fluidized biological bed filter 102 is agitated by water being supplied by the first pump 88 through a perforated tube 104 attached to the inner end 84 of the first water inlet fitting 80, as best shown in FIG. 2. Within the V-shaped structure 98 may be located at least one baffle 106 as shown in FIG. 1. This baffle, produces eddy currents which enhance the circulation of the water flowing through the filter 102. The second chamber 74 is also includes a reverse flow and settling plate 97. The plate is perpendicularly attached and extends inward from the second side 94.

The third chamber 110, which is located behind the second chamber 74, and also sequentially to the chamber 32, as best shown in FIG. 2, includes: a rear side 112, which consists of the rear member 20 of the enclosure 12, a front side 114 consisting of the rear side 76 of the second chamber 74, a first side 116 consisting of the inner side 36 of the first chamber 32, and a second side 118 consisting of a portion of a side 120 that extends across the width of said enclosure 12. The third chamber 110 is comprised of a first compartment 122 and a second compartment 144.

The first compartment 122 as shown in FIG. 1, functions as a venturi protein skimmer 124, which includes an upper section 126 with a substantially centered lateral opening 128. From each side of the opening 128 extends a downward and outward flow directing section 130. The two flow directing sections 130 form a removable A-shaped flow director 132 having lower ends 134 that rest on respective protrusions 133 attached to the first side 116 and second side 118, as best shown in FIG. 1. On one of the first compartment sides is located a bore 136 into which is inserted and attached a second water inlet fitting 138 that is attached, via a conduit 140, to a second pump 142, located within the sump 30, as shown in FIG. 1. This second pump produces oxygenated water that flows upward and enters through an opening created by the lower ends 134 of the flow directing sections 130.

The second compartment 144, as shown best in FIG. 2, is located adjacent to the first compartment 122 and includes an outward side 146 that consists of the second side 94 of the second chamber 74, that has an opening 148, as shown in FIG. 1. The opening 148 as also shown in FIG. 1, terminates with an upper flow directing lip 150 that extends outward and downward and that is attached to a level adjustment plate 152, that attaches to a slide guide 154 as shown in FIGS. 1 and 2.

To complete the structure of the venturi protein skimmer 124, a protein skimmer catch cup 126 is removably inserted into the upper section of the first compartment 122. The catch cup 126 is designed to receive organic waste product from the venturi protein skimmer through the opening 128 on the first compartment 122. The catch cup 126 is removed at periodic intervals to dispose collected organic waste product. The catch cup cleaning interval is dependent upon the size of the aquarium and the amount of waste product that is produced.

The fourth chamber 160, as shown in FIGS. 1 and 2, is the final chamber that is included in the aquarium integrated filter 10. This fourth chamber 160 has an inner side 162 that consists of the second side 118 of the third chamber 110, an outer side 164 and front and rear sides 166,168 that are comprised of the front and rear members 18,20 of the enclosure 12. The upper side of the fourth chamber 160 consists of a drip dispersement plate 170, as shown in FIG. 1, and the lower side consists of a third perforated grid 172. The upper drip dispersement plate 170 is located below the flow directing lip 150 to allow the water from the lip 150 to flow by gravity into the fourth chamber 160. Within the fourth chamber 160 is located a wet/dry filter 174, which is comprised of a multiplicity of porous plastic spheres that provide two functions: reoxygenation of the water and secondary biological filtration.

The enclosure 12 can be designed to include a micron filter 180, as shown in FIGS. 1 and 2, that is comprised of an elongated cylindrical section having a multiplicity of radial fins 182 that extend longitudinally. The cylinder has an inward end 184 and an outlet end 186 that is attached to the inner port 29 of the filter outlet fitting 28. The micron filter 180 filters micron-size particles prior to the water entering the filter outlet fitting 28.

The enclosure 12 may also be designed to include an overflow catch cup 190, as shown in FIGS. 1 and 2. The overflow catch cup 190 is more accessible than the protein skimmer catch cup 126, and has means for being removably attached to an edge of one of the side members of the enclosure 12, at a level that is below the level of the protein skimmer catch cup 126. Preferably, the attachment means consists of an inverted u-shaped hook 192 having one side of the hook attached to a side of the overflow catch cup 190 with the other hook side being available for hooking over the edge of the enclosure side member. To utilize the overflow catch cup 190, a bore 194 is located on a side of the protein skimmer catch cup 126. Into the bore 194 is attached a third water outlet fitting 196. Likewise, a bore 198 is located on a side of the overflow catch cup 190 into which is attached a third water inlet fitting 200. The two fittings 198,200 are connected by means of a conduit 202 which, in this instance, consists of a flexible vinyl tube. The overflow catch cup 190 is designed to receive the overflow of the protein waste product from the protein skimmer catch cup 126.

The final element required to operate the aquarium integrated filter 10 is the primary water pump 206. This pump is located external to the enclosure 12 and is connected via conduits 208 located between the output port 31 of filter outlet fitting 28 on the enclosure 12 and the tank inlet fitting 252 on the aquarium 250. The primary water pump 206 pumps the filtered water from the aquarium integrated filter 10 into the aquarium 250 via conduit 208. The water outflow from the tank outlet fitting 254 is re-routed, via a conduit 54, into the filter inlet fitting 52, located on the upper compartment 46 of the first chamber 32.

Operation

The operation of the salt water aquarium integrated filter 10 is presented in terms of a water flow path, with reference to the first through fourth chambers, which house the filters as shown in FIGS. 3A and 3B.

1. The water flow path, for purpose of explanation, commences at the filter inlet fitting 52 from where the water enters the first compartment 46 of the first chamber 32. The water is dispersed through the drip dispersement plate 56 onto the first perforated grid 66 upon which is located the coarse pad filter 58.
2. The filtered water from the coarse pad filter 58 is dispersed through the first perforated grid 66 into a lower compartment 60 which houses the chemical media filter 70.
3. From the chemical media filter 70 the water is dispersed through the second perforated grid 72 into the sump 30 from where the water is distributed through the first pump 88 and the second pump 142.
4. From the first pump 88 the water enters, via the conduit 86, the second chamber which houses the fluidized biological bed filter 102, and from the second pump the water enters, via the conduit 140, the third chamber which houses the venturi protein skimmer 124.
5. The filtered water exiting the fluidized biological bed filter 102 and the venturi protein skimmer 124 is dispersed through the upper drip dispersement plate 170 into the fourth chamber 160 which houses the wet/dry filter 174.
6. The water flow from the wet/dry filter 174 is finally dispersed through the third perforated grid 172 and filtered through the micron filter 180 before the water is applied through the filter outlet fitting 28. The fitting 28 is connected, via the conduit 208, to the primary water pump 206 which pumps the filtered water into the aquarium 250 through the tank inlet fitting 252.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

We claim:

1. A salt water aquarium integrated filter that filters water from an aquarium, wherein said aquarium includes a tank inlet fitting add a tank outlet fitting, wherein the tank inlet fitting is connected, via a conduit, to a filter outlet fitting located on an enclosure and the tank outlet fitting is connected, via a conduit, to a filter inlet fitting also located on said enclosure, where within said enclosure is located a sump containing water that flows through said integrated filter that is further comprised of a plurality of filtration means which are positioned and connected to provide optimal sequential filtering to maintain the purity, cleanliness and biological health of the aquarium water, wherein said plurality of filtration means comprises:

a) a fluidized biological bed filter which is supplied, via a first pump located within said sump, where said fluidized biological bed filter performs a primary nitrification process, b) a venturi protein skimmer which is supplied, via a second pump located within said sump, oxygenated water that is forced upward through a venturi adapter wherein surfactants bond with oxygen molecules and exit said venturi protein skimmer and are deposited into a protein-skimmer catch cup, wherein said catch cup is removed at periodic intervals to dispose the collected organic waste product, and c) a wet/dry filter that receives the filtered water from said fluidized biological bed filter and said venturi protein skimmer to provide secondary water nitrification and serves to reoxgenate the oxygen-depleted water, wherein from said wet/dry filter the filtered water is pumped by a primary water pump through the tank inlet fitting back into the aquarium.

2. A salt water aquarium integrated filter that filters water from an aquarium, wherein said aquarium includes a tank inlet fitting and a tank outlet fitting, wherein the tank inlet fitting is connected, via a conduit, to a filter outlet fitting located on an enclosure and the tank outlet fitting is connected, via a conduit, to a filter inlet fitting also located on said enclosure, where within said enclosure is located a sump containing water that flows through said integrated filter that is further comprised of a plurality of filtration means which are positioned and connected to provide optimal sequential filtering to maintain the purity, cleanliness and biological health of the aquarium water wherein said plurality of filtration means comprises:

a) a coarse pad filter which initially receives the water from said aquarium via said filter inlet fitting and that functions to remove larger particulate matter and waste particles, b) a chemical media filter which receives the filtered water from said coarse pad filter and further removes dissolved chemical toxins and traps smaller waste particles, c) a fluidized biological bed filter which is supplied, via a first pump located within said sump, the filtered water from said coarse pad filter and said chemical media filter prior to flowing into said sump, where said fluidized biological bed filter performs a primary nitrification process, d) a venturi protein skimmer which is supplied, via a second pump located within said sump, oxygenated water that is forced upward through a venturi adapter wherein surfactants bond with oxygen molecules and exit said venturi protein skimmer and are deposited into a protein-skimmer catch cup, wherein said catch cup is removed at periodic intervals to dispose the collected organic waste product, and e) a wet/dry filter that receives the filtered water from said fluidized biological bed filter and said venturi protein skimmer to provide secondary water nitrification and serves to reoxygenate the oxygen-depleted water, wherein from said wet/dry filter the filtered water is pumped by a primary water pump through the tank inlet fitting back into the aquarium.

3. A salt water aquarium integrated filter that filters water from an aquarium, wherein said aquarium includes a tank inlet fitting and a tank outlet fitting, wherein the tank inlet fitting is connected, via a conduit, to a filter outlet fitting located on an enclosure and the tank outlet fitting is connected, via a conduit, to a filter inlet fitting also located on said enclosure, where within said enclosure is located a sump containing water that flows through said integrated filter that is further comprised of a plurality of filtration means which are positioned and connected to provide optimal sequential filtering to maintain the purity, cleanliness and biological health of the aquarium water wherein said plurality of filtrating means comprises:

a) a coarse pad filter which initially receives the water from said aquarium via said filter inlet fitting and that functions to remove larger particulate matter and waste particles, b) a chemical media filter which receives the filtered water from said coarse pad filter and further removes dissolved chemical toxins and traps smaller waste particles, c) a fluidized biological bed filter which is supplied, via a first pump located within said sump, the filtered water from said coarse pad filter and said chemical media filter prior to flowing into said sump, wherein said fluidized biological bed filter includes a structure that comprises at least one baffle that produces eddy currents, which enhance the circulation of the water flowing through said fluidized biological bed filter, wherein said fluidized biological bed filter performs a primary nitrification process, d) a venturi protein skimmer which is supplied, via a second pump located within said sump, oxygenated water that is forced upward through a venturi adapter wherein surfactants bond with oxygen molecules and exit said venturi protein skimmer and are deposited into a protein-skimmer catch cup, wherein said catch cup is removed at periodic intervals to dispose the collected organic waste product, and e) a wet/dry filter that receives the filtered water from said fluidized biological bed filter and said venturi protein skimmer to provide secondary water nitrification and serves to reoxygenate the oxygen-depleted water, wherein from said wet/dry filter the filtered water is pumped by a primary water pump through the tank inlet fitting back into the aquarium.

4. A salt water aquarium integrated filter that filters the water from an aquarium, wherein said aquarium includes a tank inlet fitting and a tank outlet fitting, wherein the tank inlet fitting is connected, via a conduit, to a filter outlet fitting located on an enclosure and the tank outlet fitting is connected, via a conduit, to a filter inlet fitting also located on said enclosure, where within said enclosure is located a sump containing water that flows through said integrated filter that is further comprised of a plurality of filtration means which are positioned and connected to provide optimal sequential filtering to maintain the purity, cleanliness and biological health of the aquarium water wherein said plurality of filtrating means comprises:

a) a coarse pad filter which initially receives the water from said aquarium via said filter inlet fitting and that functions to remove larger particulate matter and waste particle, b) a chemical media filter which receives the filtered water from said coarse pad filter and further removes dissolved chemical toxins and traps smaller waste particles, c) a fluidized biological bed filter which is supplied, via a first pump located within said sump, the filtered water from said coarse pad filter and said chemical media filter prior to flowing into said sump, wherein said fluidized biological bed filter performs a primary nitrification process, d) a venturi protein skimmer which is supplied, via a second pump located within said sump, oxygenated water that is forced upward through a venturi adapter wherein surfactants bond with oxygen molecules and exit said venturi protein skimmer and are deposited into a protein-skimmer catch cup, wherein said catch cup is removed at periodic intervals to dispose the collected organic waste product, e) a wet/dry filter that receives the filtered water from said fluidized biological bed filter and said venturi protein skimmer to provide secondary water nitrification and serves to reoxygenate the oxygen-depleted water, wherein from said wet/dry filter the filtered water is pumped by a primary water pump through the tank inlet fitting back into the aquarium, and f) a micron filter positioned within said enclosure against said filter outlet fitting, where said micron filter filters micron size particles prior to the water exiting said filter outlet fitting.

5. A salt water aquarium integrated filter that filters water from an aquarium, wherein said aquarium includes a tank inlet fitting and a tank outlet fitting, wherein the tank inlet fitting is connected, via a conduit, to a filter outlet fitting located on an enclosure and the tank outlet fitting is connected, via a conduit, to a filter inlet fitting also located on said enclosure, where within said enclosure is located a sump containing water that flows through said integrated filter that is further comprised of a plurality of filtration means which are positioned and connected to provide optimal sequential filtering to maintain the purity, cleanliness and biological health of the aquarium water wherein said plurality of filtrating means comprises:

a) a coarse pad filter which initially receives the water from said aquarium via said filter inlet fitting and that functions to remove larger particulate matter and waste particles, b) a chemical media filter which receives the filtered water from said coarse pad filter and further removes dissolved chemical toxins and traps smaller waste particles, c) a fluidized biological bed filter which is supplied, via a first pump located within said sump, the filtered water from said coarse pad filter and said chemical media filter prior to flowing into said sump, wherein said fluidized biological bed filter performs a primary nitrification process, d) a venturi protein skimmer which is supplied, via a second pump located within said sump, oxygenated water that is forced upward through a venturi adapter wherein surfactants bond with oxygen molecules and exit said venturi protein skimmer and are deposited into a protein-skimmer catch cup, wherein said catch cup is removed at periodic intervals to dispose the collected organic waste product, wherein said venturi protein skimmer further comprises a water-level adjustment plate for said venturi protein skimmer that is adjustably attached to an inner side of said enclosure wherein said plate allows the level of the water in said venturi protein skimmer to be controlled relative to the particular dimensions of said enclosure, a wet/dry filter that receives filtered water from said fluidized biological bed filter and said venturi protein skimmer to provide secondary water nitrification and serves to reoxygenate the oxygen-depleted water, wherein from said wet/dry filter the filtered water is pumped by a primary water pump through the tank inlet fitting back into the aquarium, and e) a micron filter positioned within said enclosure against said filter outlet fitting, where said micron filter filters micron size particles prior to the water exiting said filter.

6. A salt water aquarium integrated filter that filters water for an aquarium which includes a tank inlet fitting and a tank outlet fitting, said integrated filter comprising:

a) an enclosure consisting of a first side member, a second side member having a bore therethrough into which is attached a filter outlet fitting having an inner port and an outer port, a front member, a rear member and a lower member, b) a sump which is located across the lower member between said first and second side members and between said front and rear members, c) a first chamber having an outer side that is formed by the first side member of said enclosure, an inner side having a lower edge that interfaces with said sump, and front and rear sides that are comprised of the rear and front side members of said enclosure, said first chamber further comprising:

(1) an upper compartment consisting of an upper section having a bore therethrough into which is attached a filter inlet fitting that is connected, via a conduit, to the tank outlet fitting on said aquarium, wherein said water from said inlet fitting is dispersed by a drip dispersement plate onto a first perforated grid upon which is placed a coarse pad filter, (2) a lower compartment having an upper section consisting of the first perforated grid and having a lower, second perforated grid upon which is placed a chemical media filter, d) a second chamber with a rear side having a bore into which is attached a first water inlet fitting that includes an outer end and an inner end, where the outer end is attached, via a conduit, to a first pump, a front side that consists of the front member of said enclosure and a first side and a second side, wherein from the center of the first and second sides angles inward two sections that form an enclosed V-shaped structure having an apex that is located within said sump and above the lower member of said enclosure, where into said V-shaped structure is located a fluidized biological bed filter which is agitated by water being supplied by said first pump through a perforated tube attached to the inner side of said first water inlet fitting, e) a third chamber having a rear side that consists of the rear member of said enclosure, a front side consisting of the rear side of said second chamber, a first side consisting of the inner side of said first chamber, a second side consisting of a portion of a side that extends across the width of said enclosure, said third chamber further comprising:

(1) a first compartment that functions as a venturi protein skimmer and that includes a lower section having a substantially centered lateral opening from where each side of said opening extends downward and outward a flow directing section, where the two flow directing sections form an A-shaped flow director having lower ends that terminate behind and above said fluidized biological bed filter, with one of said first compartment sides having a bore therethrough into which is inserted and attached a second water inlet fitting that is attached, via a conduit, to a second pump located within said sump, wherein said second pump draws air producing oxygenated water that enters through the lower ends of the two flow directing sections, (2) a second compartment located adjacent to said first compartment comprising an outward side having an opening that terminates with an upper flow directing lip that extends outward and downward, f) a protein skimmer catch cup removably inserted into the upper section of said first compartment that receives the organic waste product from the venturi protein skimmer that is emitted through an opening on said first compartment, where said catch cup is removed at periodic intervals to dispose the collected organic waste product, g) a fourth chamber having an inner side consisting of the second side of said third chamber, an outer side consisting of the second side member of said enclosure, front and rear sides that are comprised of the front and rear members of said enclosure, a drip dispersement plate located below said flow directing lip and a third perforated grid, where within said fourth chamber is located a wet/dry filter, and h) a primary water pump located external to said enclosure that is connected, via conduits, between the filter outlet fitting on said enclosure and the tank inlet fitting, where said primary water pump pumps the filtered water from said integrated filter into the aquarium where the water outflow from the tank outlet fitting is re-applied, via a conduit, into the filter inlet fitting where the filtration cycle is repeated.

7. The integrated filter as specified in claim 6 wherein said conduit is comprised of a plastic tube.

8. The integrated filter as specified in claim 7 wherein said plastic tube comprises polyvinyl chloride (PVC).

9. The integrated filter as specified in claim 6 wherein said coarse pad filter is comprised of a coarse sponge designed to remove larger waste particles.

10. The integrated filter as specified in claim 6 wherein said V-shaped structure of said second chamber further comprises at least one baffle that produces eddy currents which enhance the circulation of the water flowing through said fluidized biological bed filter.

11. The integrated filter as specified in claim 10 wherein said fluidized biological bed filter comprises a quantity of biological-quality glass beads, which aid in maintaining the biological purity and cleanliness of the water.

12. The integrated filter as specified in claim 6 further comprising a water-level adjustment plate that is adjustably attached to the inner side of the second side of said third chamber, wherein said plate allows the level of the water to be selected relative to the particular dimensions of said enclosure.

13. The integrated filter as specified in claim 6 wherein said wet/dry filter is comprised of a multiplicity of porous plastic, spheres, which reoxygenate the water and provide secondary biological filtration.

14. The integrated filter as specified in claim 6 further comprising a micron filter consisting of an elongated cylindrical section having a multiplicity of radial fins that extend longitudinally, said micron filter also having a free-standing end and an outlet end that is attached to the inner port of said filter outlet fitting, where said micron filter filters micron-size particles prior to the water exiting said filter outlet fitting on said enclosure.

15. The integrated filter as specified in claim 6 further comprising:

a) a side of said protein skimmer catch cup having a bore therethrough into which is inserted and attached a third water outlet fitting, and b) an overflow catch cup having means for being removably attached to a side member of said enclosure, at a level below said protein skimmer catch cup, wherein said overflow catch cup has a side having a bore therethrough into which is inserted and attached a water inlet fitting which interfaces with said water outlet filter via a conduit, where said overflow catch cup receives the overflow of the protein waste product from said protein skimmer catch cup.

16. The integrated filter as specified in claim 15 wherein said means fop attaching said overflow catch cup to said enclosure comprises an inverted U-shaped structure attached to a side of said overflow catch cup, wherein said U-shaped structure is dimensioned to be placed over an edge of an enclosure side member.

\* \* \* \* \*